H. G. NORWOOD.
CHILD'S VEHICLE.
APPLICATION FILED OCT. 8, 1920.
1,373,631.
Patented Apr. 5, 1921.
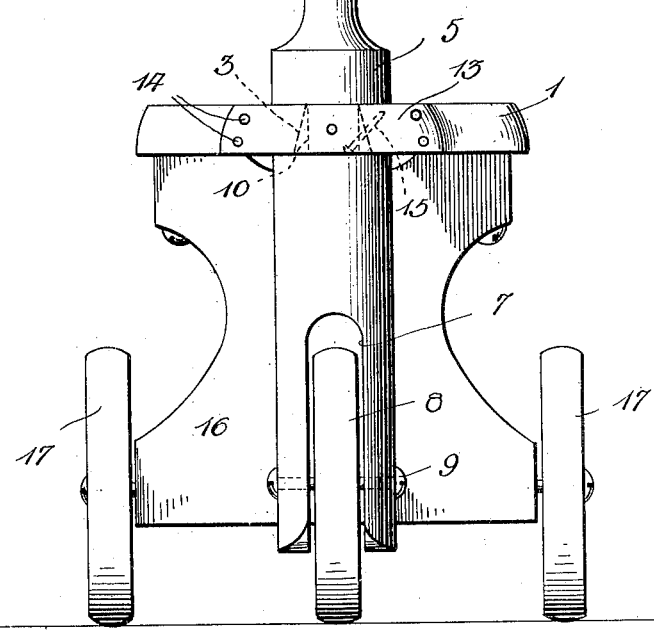
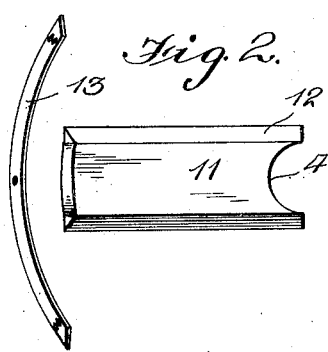
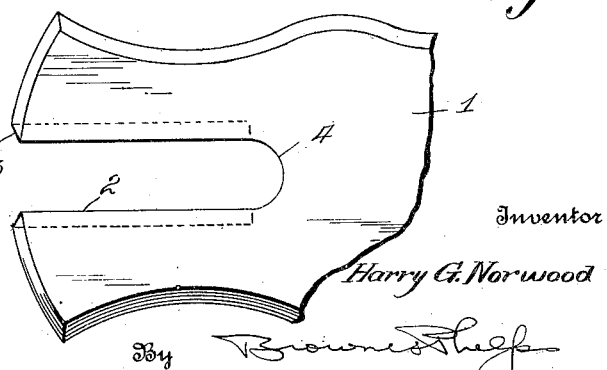

UNITED STATES PATENT OFFICE.

HARRY G. NORWOOD, OF BALTIMORE, MARYLAND, ASSIGNOR TO WILLIAM ANDREW FULD, OF BALTIMORE, MARYLAND.

CHILD'S VEHICLE.

1,373,631.      Specification of Letters Patent.      Patented Apr. 5, 1921.

Application filed October 8, 1920. Serial No. 415,633.

*To all whom it may concern:*

Be it known that I, HARRY G. NORWOOD, a citizen of the United States, residing at Baltimore, in the State of Maryland, have invented certain new and useful Improvements in Children's Vehicles, of which the following is a specification.

This invention relates to vehicles, and more particularly to children's vehicles adapted to be propelled by the occupant.

The object of the invention is to provide a child's vehicle that will be easy to knock down or set up, thus facilitating shipment and one which will be inexpensive to manufacture.

Another object is to provide a vehicle for children, that will be of knockdown construction, and will be provided with an integral steering head or column, thereby providing a much stronger toy.

With the foregoing and other objects in view as will hereinafter appear this invention consists in the peculiar combination and arrangement of the various elements of a child's vehicle as set forth in the following specification and more particularly pointed out in the appended claims.

In the accompanying drawings which constitute a part of this application,

Figure 1 is a front elevation of the vehicle;

Fig. 2 is a detail view of the bearing block and fastening means therefor, and

Fig. 3 is a fragmentary plan view of the seat portion of the vehicle.

Like characters of reference are used throughout the following specification to designate corresponding parts.

The seat or body portion 1 is preferably made of wood, and is provided at its forward end with an inwardly extending slot 2, the sides of which are beveled as at 3, or otherwise suitably formed. At the inner end of the slot 2 is a curved bearing portion or seat 4.

The steering head or column 5 is of integral construction, and is provided at its upper end with a handle 6. The lower end of the steering head 5 is bifurcated, as at 7, and has mounted therein a steering wheel 8. This wheel 8 is revoluble upon a headed bolt or axle 9, which extends through the bifurcated end of the steering head 5.

The steering head or column 5 is provided with an annular groove or slot 10, which engages and coöperates with the inwardly extending slot 2, in such a manner that its upper and lower sides engage with the upper and lower portion of the seat portion 1.

After the steering head 5 is in position at the inner end of the slot 2, the bearing block 11 is inserted, its beveled edges or sides 12 engaging the beveled sides 3, and its front end being flush with the front end of the seat 1. In the opposite end of said block is formed a rounded bearing 4' engaging the reduced portion of the steering head 5 when in assembled position. After the parts are in position, the fastening strip 13 is put in place covering the front of the seat 1 and the block 11, and held secure by means of the nails or screws 14. A nail or screw 15, or other suitable means is passed through the bottom of the block 11, and enters the seat 1, thereby further locking the parts in operative position, as illustrated in Fig. 1.

A bolster 16 is secured to the underside and near the rear end of the seat 1, and carries the wheels 17.

The main features of my invention are the unity of structure of the steering head, and the means for fastening the head in position.

It will be understood that many minor changes in detail of construction may be resorted to without departure from the spirit of the invention.

Having thus described my invention what I claim as new and desire to secure by Letters Patent of the United States is:

1. A child's vehicle comprising a seat portion having a slot at its front end, the rear end of said slot having a curved bearing portion, a one-piece steering head at the inner end of said slot, a bearing block slidable in said slot and having its rear end formed with a complementary bearing for said steering head, and means for holding said block from vertical and longitudinal movement.

2. A child's vehicle comprising a seat portion having a slot at its front end, a one-piece steering head having an annular groove, said steering head being so positioned that the annular groove engages the inner end of the slot in the seat portion, with its upper and lower sides adjacent the upper and lower sides of the seat, a bearing block slidable in the slot in the seat having its inner end provided with a curved recess to engage the steering head, and detachable means for holding said parts in position.

In testimony whereof I affix my signature hereto.

HARRY G. NORWOOD.